April 14, 1942. H. R. ELLINWOOD 2,279,866
CONDUIT SUPPORTING CLIP
Filed Aug. 24, 1940
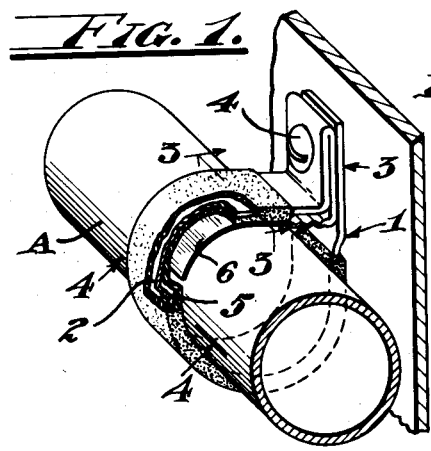
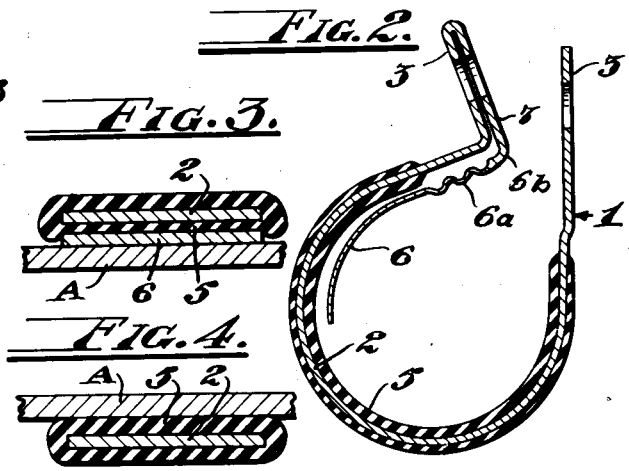
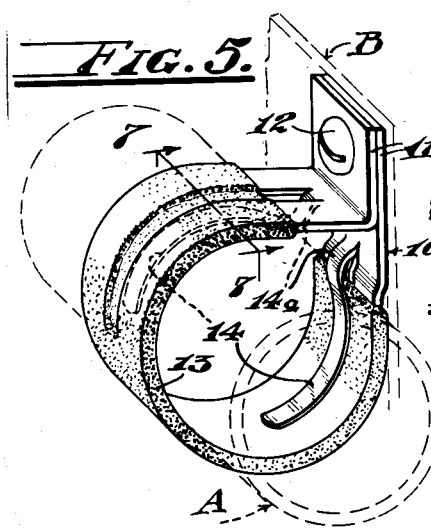
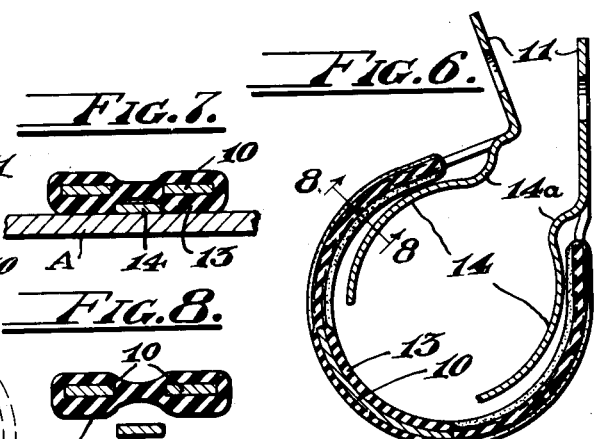
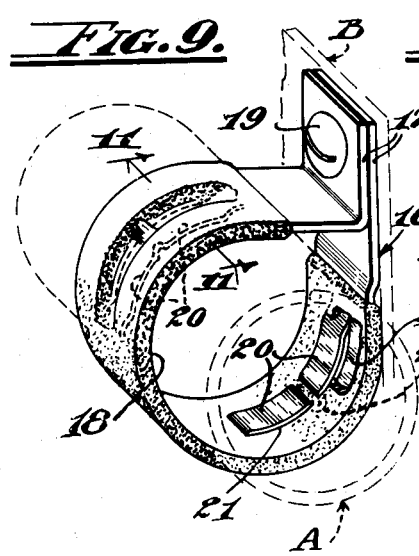
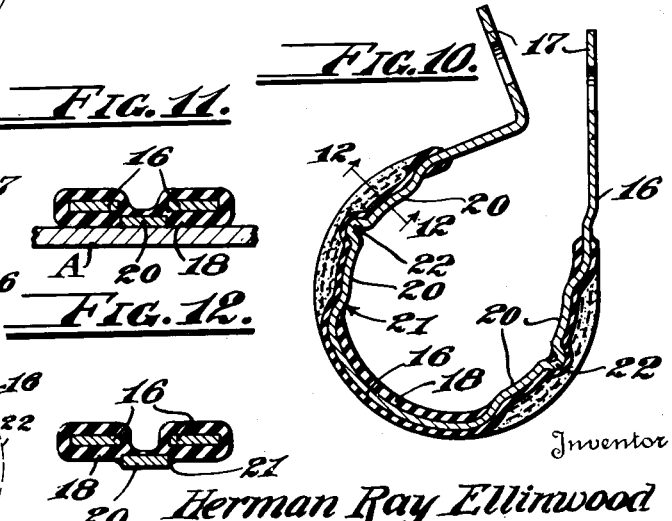
Inventor
Herman Ray Ellinwood
By R. S. Berry
Attorney Patented Apr. 14, 1942

2,279,866

UNITED STATES PATENT OFFICE 2,279,866

CONDUIT SUPPORTING CLIP

Herman Ray Ellinwood, Burbank, Calif., assignor to Adel Precision Products Corp., Burbank, Calif., a corporation of California Application August 24, 1940, Serial No. 354,105

13 Claims. (Cl. 174—40)

This invention relates to conduit supporting clips of the type shown in my application for Patent Serial No. 326,994 filed March 30, 1940, and in Letters Patent Numbers 2,215,283 and 2,227,528, issued on September 17, 1940, and January 7, 1941, respectively, wherein the clips are especially made to provide for a cushioned supporting and an electrical grounding of metallic conduit lines, such as the air, oil, fuel and other conduit or similar lines in airplanes and the like.

In modern aircraft a great many metallic conduit lines are employed and must be fastened or anchored at a multiplicity of points to structural elements of the aircraft and in such manner as to be securely held and cushioned against excessive vibration and relative movement and also electrically grounded to prevent dangerous discharges of static electricity. A modern airplane will require the use of from two to three thousand clips to provide a secure, reliable and safe anchorage of the conduit lines therein, and it is therefore essential that the clips be designed to have minimum weight, considerable strength and be capable of being quickly and easily applied. Moreover, inasmuch as the lines are subjected to considerable vibration the clip must be rugged and have the cushioning medium and the grounding strip or element securely incorporated therewith or carried thereby so that the vibration will not cause the cushion and grounding element to slip or work out of place and fail in their respective functions, or cause a loose or insecure connection of the clip and line.

The primary object of the present invention is to provide a line supporting clip for the purposes hereinbefore noted, which will afford a reliable and full cushioned and thoroughly electrically grounded support and connection of the line with respect to the structure on which the clip is mounted, and maintain these desirable qualities over long periods of time and regardless of vibration.

A further object is to provide a clip of the character described in which the cushion is carried so that it will not become displaced and fail its purpose incident to vibration or relative movement of the line and clip.

Another object is to provide a line supporting clip such as described in which the grounding strip or member is constructed, arranged and incorporated with the clip in such manner as to assist in the cushioning support of the line and yet insure that a reliable grounding of the line is effected at all times.

Yet another purpose is to provide in a clip of the character described a novel and efficacious form of tensioned grounding strip or element which will resiliently or yieldingly engage the metallic conduit line embraced by the clip, so as to maintain an effective grounding contact therewith as well as afford a cushioned support therefor.

A further purpose is to provide a line supporting clip such as described in which the grounding clip such as described in which the grounding strip or element may be formed as an integral part of the clip without impairing the cushioned support of the line in the clip.

With the foregoing objects in view, together with such other objects and advantages as may subsequently appear, the invention is carried into effect as illustrated by way of example in the accompanying drawing, in which:

Fig. 1 is a fragmentary perspective view of a clip embodying the present invention, as when in use;

Fig. 2 is a vertical section of the clip as when removed from the line;

Fig. 3 is a cross section taken on the line 3—3 of Fig. 1;

Fig. 4 is a sectional view taken on the line 4—4 of Fig. 1;

Fig. 5 is a perspective view of a modified form of the clip;

Fig. 6 is a vertical section of said modified form of clip;

Fig. 7 is a sectional view on the line 7—7 of Fig. 5;

Fig. 8 is a sectional view on the line 8—8 of Fig. 6;

Fig. 9 is a fragmentary perspective view of another modified form of clip;

Fig. 10 is a vertical section of the clip shown in Fig. 9;

Fig. 11 is a sectional view taken on the line 11—11 of Fig. 9;

Fig. 12 is a sectional view taken on the line 12—12 of Fig. 10.

Referring to the drawing more specifically, and particularly to the embodiment of the invention shown in Figs. 1 to 4 inclusive, the clip comprises a bendable resilient metal strap 1 which is adapted to embrace a metallic conduit line A, with its loop portion 2 surrounding the line while its apertured terminal portions 3 are bent angularly from the loop portion and secured in abutting relation to one another and a metallic supporting structure B by means of a screw 4 or other suitable fastening, the supporting structure B, representing, for example, a metallic structural part of an airplane.

A line embracing cushion 5 in the form of a strip is carried by the strap so as to lie between the loop portion 2 and the line A in yielding contact with both, whereby a full cushioned support for the line is provided. This cushion is made of resilient rubber or other similar resilient and compressible material and preferably is tubular and surrounds the loop portion to prevent displacement thereof from the strap as might occur if the cushion were otherwise formed or secured on the strap. The cushion may be preformed as a tube and tightly fitted over the strap or the strap may be dipped in molten rubber or the like in such manner as to form the desired coating and cushion on the strap.

In accordance with the present invention a tensioned or resilient metallic grounding member or strip 6 is provided in the clip assembly so as to be electrically connected with the strap 1 and disposed for yieldingly contacting the line A whereby to ground the latter to the structure B, through said strap. The inherent tension of the grounding strip 6 holds it in contact with the line A by a pressure acting in addition to the pressure exerted by the cushion 5 on strap 1.

As shown in Figs. 1 and 2 the grounding strip is formed integrally with the strap and is attenuated, as by stamping it to a thickness less than that of the strap proper. The reduced thickness of the grounding strip 6 permits the rubber cushion 5 to overlap the edges of the strip and therefore support substantially the entire circumference of the line A. One way of providing the integral strip or member 6 is to bend the strap back upon one of the end portions 3, as at 7, then extend the strap inwardly of the loop 2 in an arc so that the grounding member 6 takes the form of an arcuate resilient, tongue of considerably less thickness than the portion 7 and strap proper, and disposed in spaced opposed relation to a part of the loop 2 and the cushion 5. Thus the strip or member 6 will partly encircle the line in tensioned or yielding contact therewith when the ends 2 are secured tightly together and to the member B as shown in Fig. 1.

The tongue-like member 6 is preferably constructed so that it will readily flex at a predetermined point spaced from the portion thereof which will contact the line, whereby such flexure will prevent relative movement of said contacting portion and the line when the line tends to move longitudinally or otherwise due to vibration or other cause, and also when the strap is tightened on the line as in securing the clip to the line and the member B.

As here provided this flexure point is created by making a bend, fold or loop, or series of corrugations as at 6a adjacent the juncture 6b of the strip and the bent back portion 7. Such a bend, loop or series thereof will act as a flexible hinge and also provide the strip 6 with a line cushioning action when the strip is pressed between the line and cushion as shown in Figs. 1 and 3.

It should be noted that the portion 7 of the strip 6 is apertured so that the fastening element 4 will readily pass therethrough when inserted through the apertured terminals 3. The integral formation of the apertured portion 7 with one of the apertured terminals 3 constitutes a means for holding said apertured portion on said terminal of the strap 1 with the apertures in said portion and said terminal in registration. When the fastening 4 is inserted in place it will maintain the strip or tongue 6 carried by the portion 7 in the desired position overlying the cushion 5 and in contact with the conduit line embraced by the cushion and strap, so that the conduit line will be securely anchored and also electrically bonded or grounded to the metallic structure of the airplane on which the strip is mounted even if the integral joint of the strip with the strap breaks or fails in its purpose. Moreover the fastening 4 will serve as a good conductor between the bonding strip and the metal structure on which the strap is mounted and therefore the strap need not be entirely depended on to bond the strip to the airplane structure.

It is now seen that in having the cushion 5 of tubular form and the grounding member or strip 6 formed as an integral resilient arcuate tongue folded back over the inner periphery of the loop portion 2 of the strap and constructed as here shown, said cushion and strip will be securely held against displacement and reliably perform their respective functions regardless of vibratory and other movements of the line which would tend to dislodge such parts.

In the modified form of my clip as shown in Figs. 5 to 8 inclusive, the same general construction is followed as in the first described form as to the metallic resilient strap 10, ends 11, fastening 12 and tubular cushion 13, but the grounding means takes a different form. Instead of bending back the strap from one end to form a grounding strip as shown in Figs. 1 and 2, there are provided two arcuate tongue-like strips 14 which are struck from the opposed portions of the line encircling portion of the strap. These tongue-like strips 14 are resilient or tensioned and of considerably less width than the strap and lie in inwardly spaced relation to the inner periphery of the cushion so as to yieldingly engage or have a tensioned engagement with the line and the cushion. These strips 14 may be attenuated if desired in the same manner as the strip 6 to increase the flexibility thereof and may also be formed with a bend 14a to afford a hinge or flexure point for the same purpose as the bends 6a.

Fig. 6 plainly shows how the opposed tongue-like arcuate strips 14 will effectively embrace and contact the line so that it will be grounded and also have a cushioned support in the clip.

Another modified form of the clip, as shown in Figs. 9 to 12 inclusive, also follows the same general construction here disclosed as to the bendable resilient metallic strap 16, ends 17 thereof, cushion 18 and fastening means 19, but offers still another form of grounding means. This form of grounding means comprises loops 20 struck from the strap at substantially the same points as the tongues 14. These loops provide indented or inwardly disposed contact strips having both ends formed integral with the strap in contradistinction to the tongue formation of the members 14. The cushion is formed with openings 21 for exposing the loops 20 as tensioned contact strips for yieldably engaging the line. These loop-grounding strips 20 may have flexure bends 22 between their ends so that in effect each loop affords two contact portions for the conduit line and said portions afford a cushioning action for the line as do the grounding members in the other forms of my invention.

I claim:

1. In a clip for supporting and grounding a metallic conduit line, a resilient metallic line embracing strap, a line embracing cushion on said strap, and an inherently tensioned metallic grounding member in electrical connection with and carried by said strap, said grounding member having a portion disposed for yieldingly contacting the line and adapted to exert pressure on the line in addition to that exerted by the embracing strap so as to ground the line to a metallic structure on which the strap is mounted.

2. In a clip for supporting a metallic conduit line on and grounding it to a metallic structure, a metallic line embracing strap having terminal portions for attachment to the metallic structure, a line embracing cushion on said strap, and a metallic grounding member permanently electrically connected with the strap and having an inherently tensioned portion for contacting the line said portion being adapted to exert pressure on the line in addition to that exerted by the embracing strap whereby the line will be grounded to said structure through the strap.

3. In a clip for supporting and grounding a metallic conduit line, a resilient tensioned metallic strap for embracing a metallic conduit line and having terminals for attachment to a metallic structure, a line embracing cushion on the strap, and an arcuate inherently tensioned metallic grounding member carried by the strap, said grounding member being in electrical connection with one of said terminals and having a portion disposed to lie between said cushion and the line for yieldingly contacting the line, said portion being adapted to exert pressure on the line in addition to that exerted by said embracing strap.

4. In a clip for supporting and grounding a metallic conduit line, a resilient tensioned metallic strap for embracing a metallic conduit, and having terminal portions for attachment to a metallic structure, a line embracing cushion on the strap, and a metallic grounding member formed integral with the strap and disposed in a plane different from the plane of said strap for a yielding contact with the line, said grounding member being inherently tensioned to exert a pressure on the line in addition to that exerted by said embracing strap.

5. In a clip for supporting and grounding a metallic conduit line, a resilient metallic line embracing strap, a line embracing cushion on said strap, and an inherently tensioned metallic grounding member in permanent electrical connection with said strap and having a portion disposed in overlying relation to said cushion for yieldingly contacting the line so as to ground the line to a metallic structure on which the strap may be mounted, said member being of less thickness than the strap whereby said portion will conform to the contour of said line and permit said cushion to engage substantially the entire periphery of said line.

6. In a clip for supporting and grounding a metallic conduit line, a resilient metallic line embracing strap, and a metallic grounding member in permanent electrical connection with said strap and having a portion disposed for yieldingly contacting the line so as to ground the line to a metallic structure on which the strap may be mounted, said member being inherently tensioned to exert a pressure on said line in addition to that exerted by said strap and having a bent portion affording a flexure of the member at said bent portion to prevent relative movement of the line contacting portion of the member and the line.

7. In a clip for supporting a metallic conduit line on and grounding it to a metallic structure, a metallic line embracing strap having terminal portions for attachment to the metallic structure, a line embracing cushion on said strap, and a metallic grounding member formed integral with the strap and having an inherently tensioned portion for contacting the line whereby the line will be grounded to said structure through the strap, said member being adapted to exert a pressure on said line in addition to that exerted by said strap and having a bend for affording a flexure of the member without causing relative movement of the line contacting portion of the member and the line incident to vibration of the line.

8. In a clip for supporting a metallic conduit line on and grounding it to a metallic structure, a metallic line embracing strap having terminal portions for attachment to the metallic structure, a line embracing cushion on said strap, and a metallic grounding member formed integral with the strap and having a tensioned portion for contacting the line whereby the line will be grounded to said structure through the strap said member being provided as a continuation of one of said terminal portions and being folded back on the strap.

9. In a clip for supporting a metallic conduit line on and grounding it to a metallic structure, a metallic line embracing strap having terminal portions for attachment to the metallic structure, a line embracing cushion on said strap, and a metallic grounding member formed integral with the strap and having a tensioned portion for contacting the line whereby the line will be grounded to said structure through the strap, said member being provided as a continuation of one of said terminal portions and being folded back on the strap and having a bend affording a flexure of the member at a point between the joint of the member and the strap and the line contacting portion of the strap.

10. In a clip for supporting a metallic conduit line on and grounding it to a metallic structure, a metallic line embracing strap having terminal portions for attachment to the metallic structure, a line embracing cushion on said strap, and a metallic grounding member formed integral with the strap and having a tensioned portion for contacting the line whereby the line will be grounded to said structure through the strap, said grounding member being in the form of a tongue protruding inwardly from one end portion of the strap and overlying a portion of said cushion for contact with a cushion embraced portion of the line.

11. In a clip for supporting a metallic conduit line on and grounding it to a metallic structure, a metallic line embracing strap having terminal portions for attachment to the metallic structure, a line embracing cushion on said strap, and a metallic grounding member formed integral with the strap and having a tensioned portion overlying at least a portion of said cushion for contacting the line whereby the line will be grounded to said structure through the strap, said member being in the form of a tongue protruding from the strap and lying in inwardly spaced relation to the inner periphery of said cushion for contacting the line, and a bend on said grounding member affording a flexure point between the juncture of the member and the strap and the line contacting portion of said member.

12. In a clip for supporting a metallic line on and electrically bonding it to a metallic structure, a metallic line embracing strap having terminals with apertures formed therein adapted to receive means for securing said strap to said structure, a resilient insulating cushion carried by said strap for embracing said line, and an electrically conductive bonding strip having an aperture therein for registration with the apertures in said terminals and to receive said securing means, said strip being securely connected to one of said terminals, and a portion of said strip being disposed in overlying relation to said cushion to contact said line thereby electrically bonding said line to said structure.

13. In a clip for supporting a metallic line on and electrically bonding it to a metallic structure, a metallic line embracing strap having terminals with apertures formed therein adapted to receive means for securing said strap to said structure, a resilient insulating cushion carried by said strap for embracing said line, said cushion terminating adjacent said terminals, and an electrically conductive bonding strip having an aperture therein for registration with the apertures in said terminals and to receive said securing means, said strip being securely connected at one end to one of said terminals and having its other end portion disposed in overlying relation to the end portion of said cushion adjacent the terminal to which said strip is connected and curved away therefrom to contact and conform to said line thereby electrically bonding said line to said structure, and said bonding strip having a flexure bend intermediate the aperture therein and the portion thereof overlying the cushion and conforming to the line.

HERMAN RAY ELLINWOOD.